(12) United States Patent
Oveis Gharan et al.

(10) Patent No.: US 10,735,135 B2
(45) Date of Patent: Aug. 4, 2020

(54) VARIABLE SPECTRAL EFFICIENCY OPTICAL MODULATION SCHEMES

(71) Applicant: Ciena Corporation, Hanover, MD (US)

(72) Inventors: Shahab Oveis Gharan, Nepean (CA); Kim B. Roberts, Ottawa (CA); Akbar Ghasemi, Kanata (CA); Mahmoud Taherzadehboroujeni, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/595,709

(22) Filed: Oct. 8, 2019

(65) Prior Publication Data

US 2020/0036475 A1 Jan. 30, 2020

Related U.S. Application Data

(63) Continuation of application No. 15/616,997, filed on Jun. 8, 2017, now abandoned, which is a continuation of application No. 13/917,339, filed on Jun. 13, 2013, now Pat. No. 9,698,939.

(51) Int. Cl.

| H04L 1/00 | (2006.01) |
| H04B 10/516 | (2013.01) |
| H04L 1/20 | (2006.01) |
| H04L 27/34 | (2006.01) |
| H04B 10/50 | (2013.01) |

(52) U.S. Cl.
CPC ....... *H04L 1/0042* (2013.01); *H04B 10/5055* (2013.01); *H04B 10/516* (2013.01); *H04L 1/0003* (2013.01); *H04L 1/206* (2013.01); *H04L 27/3405* (2013.01)

(58) Field of Classification Search
CPC ..... H04L 1/0042; H04L 1/0003; H04L 1/206; H04L 27/3405; H04B 10/5055; H04B 10/516

See application file for complete search history.

(56) References Cited

U.S. PATENT DOCUMENTS

| 5,511,082 A | 4/1996 | How et al. |
| 5,923,651 A | 7/1999 | Struhsaker |
| 5,953,377 A | 9/1999 | Yoshida |

(Continued)

OTHER PUBLICATIONS

"Series G: Transmission Systems and Media, Digital Systems and Networks: Digital sections and digital line system—Optical fibre submarine cable systems", ITU-T Recommendation G.975.1, Feb. 2004.

(Continued)

*Primary Examiner* — Sung S Ahn
(74) *Attorney, Agent, or Firm* — Clements Bernard Walker; Lawrence A. Baratta, Jr.; Christopher L. Bernard

(57) ABSTRACT

A transmitter of a communications system includes a first encoder configured to apply a shaping operation to a data signal to generate a shaped data signal, a second encoder configured to encode the shaped data signal according to a forward error correction (FEC) scheme to generate an encoded signal, and a constellation mapper configured to modulate the encoded signal to symbol values according to a modulation scheme to generate a corresponding symbol stream for transmission through the communications system. The shaping operation reduces average constellation energy for constellations of the modulation scheme.

18 Claims, 8 Drawing Sheets

(56) References Cited

U.S. PATENT DOCUMENTS

| | | | |
|---|---|---|---|
| 6,501,396 | B1 | 12/2002 | Kryzak et al. |
| 7,386,240 | B2 | 6/2008 | Thomson et al. |
| 2002/0044073 | A1 | 4/2002 | Ungerboeck et al. |
| 2005/0047433 | A1 | 3/2005 | Rizer et al. |
| 2005/0233710 | A1 | 10/2005 | Lakkis et al. |
| 2008/0002761 | A1 | 1/2008 | Edsall et al. |
| 2008/0270528 | A1 | 10/2008 | Girardeau et al. |
| 2009/0015446 | A1 | 1/2009 | Coene |
| 2010/0229071 | A1 | 9/2010 | Ganga et al. |
| 2010/0275100 | A1 | 10/2010 | Yokokawa et al. |
| 2011/0010609 | A1* | 1/2011 | Diab ............ H04L 1/0041 714/780 |
| 2012/0250785 | A1 | 10/2012 | Vidal et al. |
| 2012/0260142 | A1* | 10/2012 | Arabaci ......... H03M 13/1171 714/752 |
| 2012/0307934 | A1 | 12/2012 | Heidari et al. |
| 2013/0343446 | A1 | 12/2013 | Eliaz et al. |

OTHER PUBLICATIONS

"Series G: Transmission Systems and Media, Digital Systems and Networks: Packet over Transport aspects—Quality and availability targets", Recommendation ITU-T G.8201, Apr. 2011.

Agrell, et al., "Power-Efficient Modulation Formats in Coherent Transmission Systems", Journal of Lightwave Technology, vol. 27, No. 22, Nov. 15, 2009.

Ahn, Advisory Action(Final OA6) for U.S. Appl. No. 13/917,339, dated Feb. 10, 2017.

Ahn, Fifth Office Action for U.S. Appl. No. 13/917,339, dated Jul. 1, 2016.

Ahn, Notice of Allowance for U.S. Appl. No. 13/917,339, dated Mar. 1, 2017.

Ahn, Sixth Office Action (Final) for U.S. Appl. No. 13/917,339, dated Jan. 5, 2017.

Ahn, Advisory Action for U.S. Appl. No. 15/616,997, dated Jul. 17, 2019.

Ahn, Third Office Action for U.S. Appl. No. 15/616,997, dated Apr. 15, 2019.

Bliss, "Circuitry for Performing Error Correction Calculations on Baseband Encoded Data to Eliminate Error Propagation", ip.com, Mar. 1, 1981.

Bocherer, "Achievable Rates for Probabilistic Shaping", May 23, 2018.

Bocherer, et al., "High Throughput Probabilistic Shaping with Product Distribution Matching", Feb. 24, 2017.

Calderbank, et al., "Nonequiprobable Signaling on the Gaussian Channel", IEEE Transactions on Information Theory, vol. 36, No. 4, Jul. 1990.

Chang, et al., "Forward Error Correction for 100 G Transport Networks", IEEE Communications Magazine, Mar. 2010.

Djordjevic, et al., "Constrained Coding Techniques for the Suppression of Intrachannel Nonlinear Effects in High-Speed Optical Transmission", Journal of Lightwave Technology, vol. 24, No. 1, Jan. 2006.

Fan, et al., "Constrained Coding Techniques for Soft Iterative Decoders", Global Telecommunications Conference—Globecom'99, 1999.

Forney, Jr., et al., "Multidimensional Constellations—Part I: Introduction, Figures of Merit, and Generalized Cross Constellations", IEEE Journal on Selected Areas in Communications, vol. 7, No. 6, Aug. 1989.

Kschischang, et al., "Optimal Nonuniform Signaling for Gaussian Channels", IEEE Transactions on Information Theory, vol. 39, No. 3, May 1993.

Lotz, et al., "Coded PDM-OFDM Transmission with Shaped 256-Interactive Polar-Modulation Achieving 11.15-b/sHz Intrachannel Spectral Efficiency and 800-km Reach", T.H. Lotz, et al., IEEE, 2011, pp. 1-9.

Mahadevappa, et al., "Comparison of 128QAM mappings/labelings for 802.11n", Nov. 2003.

Ramabadran, "A Coding Scheme for m-out-of-n Codes", IEEE Transactions on Communications, vol. 38, No. 8, Aug. 1990.

Raphaeli, et al., "Constellation Shaping for Pragmatic Turbo-Coded Modulation With High Spectral Efficiency", IEEE Transactions on Communications, vol. 52, No. 3, Mar. 2004.

Roberts, et al., "Performance of Dual-Polarization QPSK for Optical Transport Systems", Journal of Lightwave Technology, vol. 27, No. 16, Aug. 15, 2009.

Schulte, et al., "Divergence-Optimal Fixed-to-Fixed Length Distribution Matching With Shell Mapping", Dec. 13, 2018.

Winzer, "High-spectral-efficiency optical modulation formats", Peter J. Winzer, IEEE, 2011, pp. 1-12.

Yoshida, et al., "Hierarchical Distribution Matching for Probabilistic Shaped Coded Modulation", Dec. 26, 2018.

\* cited by examiner

VARIABLE SPECTRAL EFFICIENCY OPTICAL MODULATION SCHEMES

CROSS-REFERENCE

This application is a continuation of U.S. Ser. No. 15/616,997 filed Jun. 8, 2017, which is itself a continuation of U.S. Ser. No. 13/917,339 filed Jun. 13, 2013 (now U.S. Pat. No. 9,698,939 issued Jul. 4, 2017). The contents of both applications are incorporated herein by reference.

TECHNICAL FIELD

The present application relates generally to management of communications systems, and more specifically to variable bandwidth optical modulation schemes.

BACKGROUND

For achieving long distance optical signal transmission, at moderate spectral efficiencies, dual polarization Binary Phase Shift Keying (DP-BPSK) and coherent detection are commonly used. As is known in the art, BPSK encodes a single bit value ("0" or "1") onto an optical carrier by modulating the carrier phase between two constellation points that are separated by 180°. DP-BPSK achieves a spectral efficiency of 2-bits per symbol period (baud), by independently modulating single bit values onto each of the orthogonal polarization modes of the optical carrier. This is illustrated in FIG. 1, which shows the BPSK constellation mapped onto the Real (Re)-Imaginary (Im) plane of each of the X- and Y-polarizations.

As is known in the art, other modulation schemes enable increased spectral efficiency by encoding increased numbers of bits per baud. For example, Quadrature Phase Shift Keying (QPSK) enables two bits to be encoded on each polarization, and thus four bits per baud for dual polarization QPSK (DP-QPSK), by using a symmetrical 4-point constellation, as may be seen in FIG. 2. Other modulation schemes, such as Quadrature Amplitude Modulation (QAM) achieve even higher numbers of bits per baud by modulating both the phase and amplitude of the optical field. However, as the number of encoded bits-per-baud increases, the Euclidian distance between neighbouring constellation points decreases. For example, in the BPSK constellations shown in FIG. 1, each constellation point is separated from its neighbour by an angle corresponding to 180° in the Re-Im plane. On the other hand, in the QPSK constellations shown in FIG. 2, each constellation point is separated from its neighbour by an angle corresponding to 90° in the Re-Im plane. The reduced separation between adjacent constellation points results in a corresponding decrease in system margin, which limits the maximum signal reach.

Other things being equal, relative system margin varies inversely with the number bits per baud, and both of these parameters are fixed by the encoding scheme. For example, FIG. 3 is a chart schematically showing the relative system margin vs. bits-per-baud for DP-BPSK, DP-QPSK and 16-QAM encoding schemes. In the example FIG. 3, DP-BPSK has the lowest spectral efficiency (2 bits-per-baud) but the highest system margin (and thus signal reach), whereas 16-QAM has the highest spectral efficiency (8 bits-per-symbol) but the lowest system margin.

For an optical communications system having a given baud rate, the specific spectral efficiency and relative system margin of each encoding scheme translates into respective values of bandwidth and signal reach. Accordingly, a network service provider must select an encoding scheme that provides a combination of bandwidth and signal reach that most nearly satisfies the anticipated demand, within the performance capabilities of the network. However, this frequently leads to sub-optimal utilization of the network resources, because the selected encoding scheme will almost invariably have lower spectral efficiency than is permitted by the network performance in order to ensure adequate system margin. Furthermore, if the network service provider wants to change the system margin, for example, they can only do so by changing the encoding scheme. However, this can produce a large step-wise change in both system margin and spectral efficiency, which may also be undesirable.

Various known codes have been used in electrical systems to ensure a minimum number of transitions in a bit sequence. For example, 8B/10B is a line code that maps 8-bit symbols to 10-bit symbols to achieve DC-balance and bounded disparity, and yet provide enough state changes to allow reasonable clock recovery. This means that the difference between the count of 1 s and 0 s in a string of at least 20 bits is no more than 2, and that there are not more than five 1 s or 0 s in a row. This helps to reduce the demand for the lower bandwidth limit of the channel necessary to transfer the signal. Known scrambling techniques make this irrelevant in modern high speed fiber systems.

It is known that block shaping codes, such as the shell codes described in Precoding and Signal Shaping for Digital Transmission; Robert F. H. Fischer; John Wiley & Sons, Inc., 2002, ISBN: 0-471-22410-3, can reduce the average power of the signal by adjusting the probability of occurrence of values of the bits, and efficiently encode fractional bits per Baud. For example, the probability of a certain bit equaling 0 might be 0.75, and the probability of it equaling 1 would be 0.25. With Pulse Amplitude Modulation (PAM), this reduces the average power transmitted by a factor of two. However, when decoding these blocks, one symbol error can produce a large number of bit errors. At the symbol error rates of modern fiber systems (on the order of 5%) this error multiplication offsets the performance gains from the coding. If a symbol error results in a change in the number of bits out of the code, the resulting misalignment can cause a burst of 50% bit errors that persists for thousands of bits.

Forward Error Correction is a well-known method for reducing bit error rates. However, the parity calculations for the added redundant bits produce an encoded signal in which the probability of any given bit having a value of '1' reverts to approximately 0.5, even when the input bits deliberately have quite different probability distributions.

Trellis coding has been used in an attempt to overcome the problems of error multiplication and reversion towards 0.5 probability. Symbol level redundancy is included when shaping. Iterative Soft In Soft Out (SISO) decoding across the sequence of symbols is used to gradually reduce the symbol error rate while decoding. This decoding would be very challenging to implement with any significant performance improvement, at the high speeds and high noise levels of modern optical fiber communications systems.

What is desired is a technique that enables spectral efficiency and system margin to be optimized.

SUMMARY

An aspect of the present invention provides a method of transmitting a data signal using an optical transmitter of an optical communications system. An N/M mapping encoder processes an N-bit input vector in accordance with a first mapping to generate a corresponding M-bit data stream. A Forward Error Correction (FEC) encoder processes the M-bit data stream in accordance with a predetermined encoding scheme to generate an encoded symbol stream. A modulator modulates a carrier light in accordance with the encoded symbol stream to generate an optical signal for transmission through the optical communications system. The first mapping can be adjusted to maximize performance of the optical communications system.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
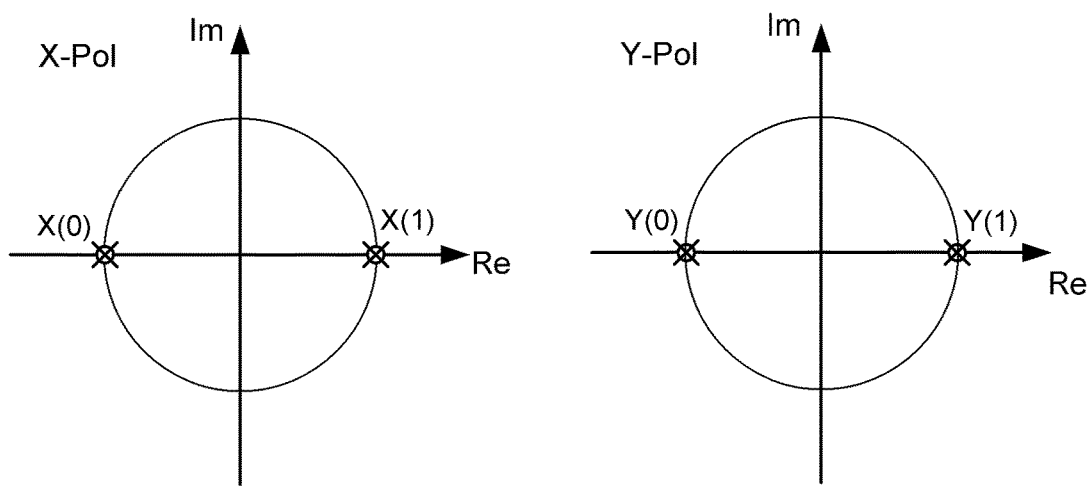
FIG. 1 illustrates a DP-BPSK signal constellation in the Real (Re)/Imaginary (Im) plane.
Figure 2:
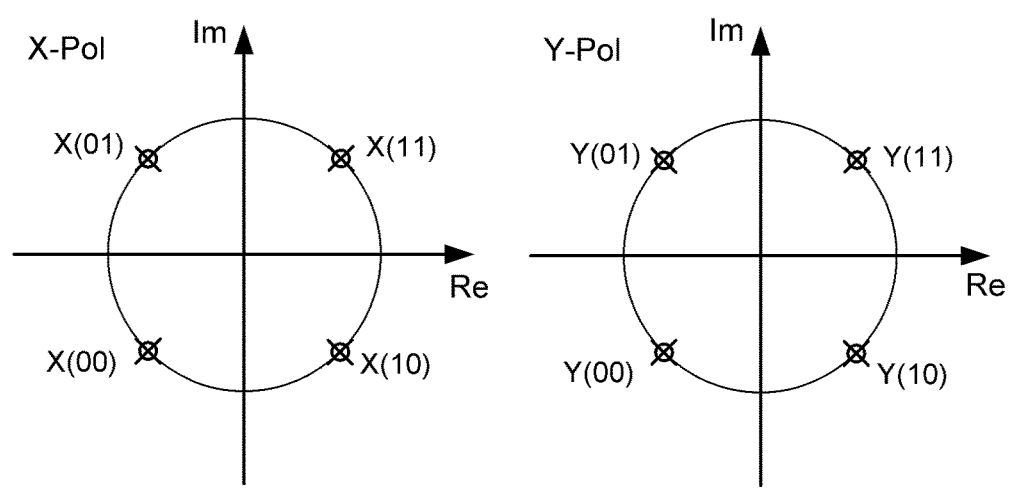
FIG. 2 illustrates a DP-QPSK signal constellation.
Figure 3:
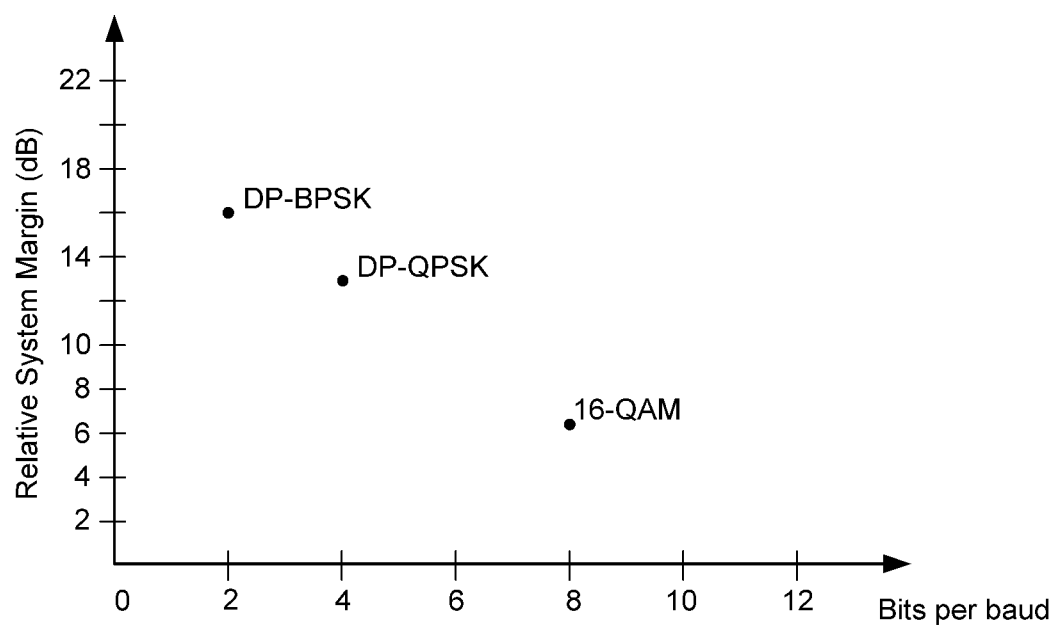
FIG. 3 is a chart illustrating Relative System Margin and data bits-per-baud characteristic of three encoding schemes known in the art.
Figure 4:
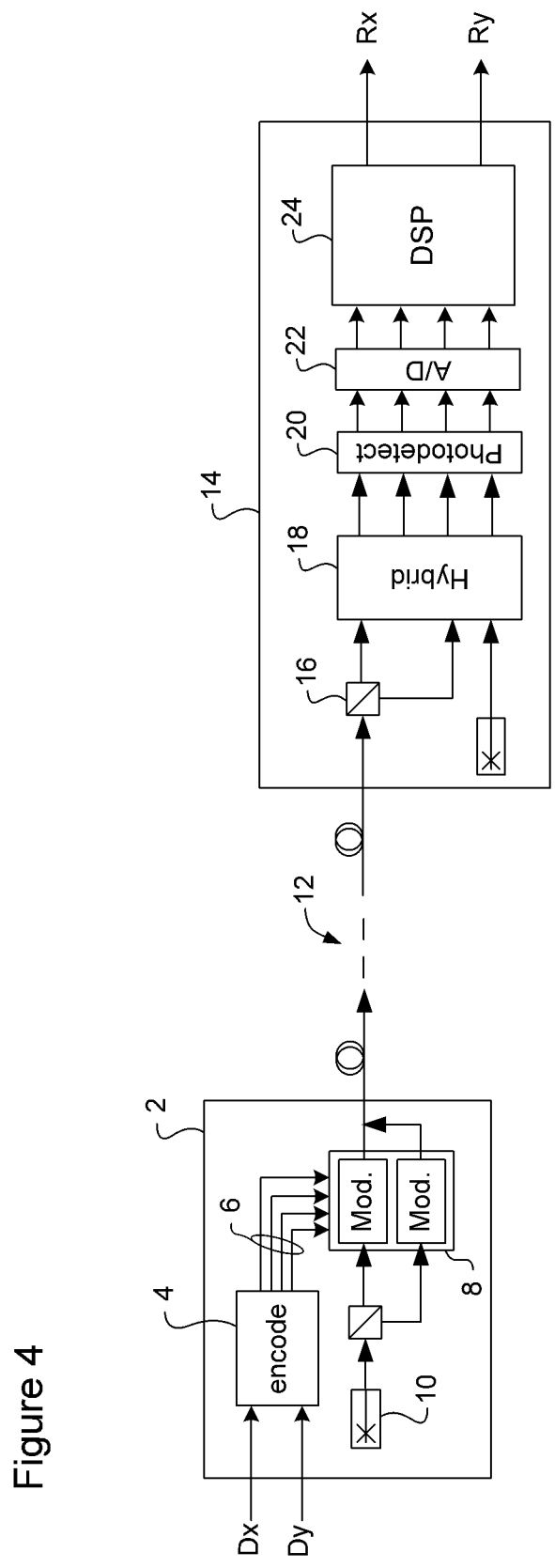
FIG. 4 is a block diagram illustrating elements of an optical communications system.

FIG. 4 illustrates a representative optical communication system in which techniques in accordance with the present disclosure may be implemented. In the optical communication system of FIG. 4, a transmitter 2 generally comprises an encoder 4 for encoding a pair of data signals (Dx and Dy) to generate a set of drive signals 6. The drive signals are then supplied to a modulator 8 for modulating respective dimensions of a continuous wave (CW) optical carrier in accordance with the drive signals. In the example of FIG. 4, a pair of data signals (Dx and Dy) may be encoded as 4 drive signals, which are then used to modulate two dimensions (e.g. phase and amplitude, or I and Q) of each orthogonal polarization of the optical carrier. The CW carrier is typically generated by a laser 10 in a manner known in the art, and the modulator may be implemented using any of a variety of known modulator devices, such as phase modulators, variable optical attenuators, Mach-Zehnder interferometers etc. The modulated optical signal appearing at the output of the modulator is transmitted through an optical fiber link 12 to a coherent receiver 14.

A receiver 14 configured to receive and detect the transmitted data signals may be provided as a coherent receiver, which includes a polarization beam splitter 16 for splitting the received optical signal into received X and Y polarizations, an optical hybrid 18 for separately mixing the X and Y polarizations with a local oscillator, and a set of photodetectors 20 for detecting the optical power of each of the mixing products generated by the optical hybrid 18. An Analog to Digital (A/D) converter block 22 samples each photodetector current, and the resulting sample streams—each of which represents one of the modulated dimensions of the optical carrier field—are processed by a Digital Signal Processor (DSP) 24 in accordance with the M-dimensional constellation to generate recovered signals Rx and Ry that correspond with the transmitted data signals Dx and Dy.

The present application provides techniques for transmitting the data signals Dx and Dy with a variable spectral efficiency.

Figure 5:
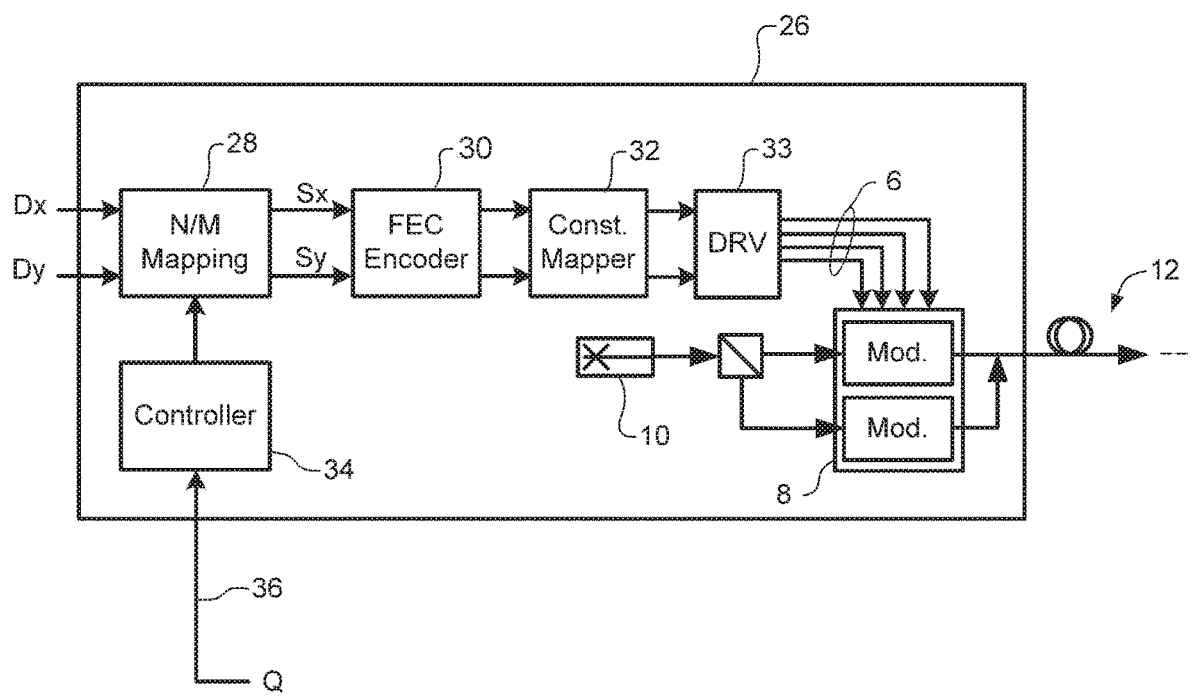
FIG. 5 is a block diagram illustrating elements of a transmitter in accordance with a representative embodiment of the present invention.

FIG. 5 illustrates a representative transmitter 26 implementing techniques in accordance with the present invention. In the example embodiment of FIG. 5, the data signals Dx and Dy are supplied to an N/M mapping encoder 28 which operates to map the data signals Dx and Dy to a corresponding pair of digital signals Sx and Sy using a mapping function described in greater detail below. The digital signals Sx and Sy output from the N/M mapping encoder 28 are then supplied to a Forward Error Correction (FEC) encoder 30 cascaded with a constellation mapper 32 and a driver 33 to generate drive signals 6 for modulating the optical channel lights in a conventional manner. At the receiver 14 (FIG. 4), the DSP 24 processes the sample streams output from the A/D block 22 to generate first recovered signals corresponding to the digital signals Sx and Sy, and then reverses the mapping function of the N/M mapping encoder 28 to generate the recovered signals Rx and Ry that correspond with the transmitted data signals Dx and Dy.

The driver 33 may operate in a manner known in the art to generate analog drive signals 6 based on the symbol stream received from the constellation mapper 32. In some embodiments, the driver 33 may include one or more digital-to-analog circuits (DACs) along with appropriate analog and/or digital signal processing circuits to perform conditioning, scaling and filtering functions as needed to generate drive signals 6 capable of driving the modulator 8 to modulate the carrier light from the laser 10 to generate the desired optical signal at the output of the transmitter 26.

The FEC encoder 30 may operate to process the digital signals Sx and Sy to calculate and insert parity bits using known techniques, which may be selected based on expected symbol error rates of the optical communications system. The constellation mapper 32 may be used to map the FEC encoded signals to constellation point values in accordance with a selected modulation scheme. In general, the constellation mapper 32 may be implemented using any suitable combination of hardware and software. In some embodiments, the constellation mapper 32 may be implemented using a Random Access Memory (RAM) Look-up table (LUT), which has an advantage in that such a mapper 32 is programmable. This means that, for example, the modulation scheme and/or the value of each constellation point of the modulation scheme may be adjusted as desired. For example, a RAM can be divided into two or more pages, each of which contains a respective LUT for implementing the constellation mapping function. In such a case, the modulation scheme can be changed by loading an appropriate LUT into an unused page of the RAM, and then selecting that page for use.

In some embodiments, the modulation scheme implemented by the constellation mapper 32 may be selected to achieve maximum data transmission speed through the link 12 under optimum conditions. If desired, other equivalent criteria may be used, such as, for example, minimum permissible relative system margin under optimum conditions.

For example, if the optical link can support 16-QAM modulation under optimum conditions, then the constellation mapper 32 may be designed to map the FEC-encoded signals from the FEC encoder 30 into symbols of a 16-QAM constellation.

In general terms, the N/M mapping encoder 28 may comprise any suitable combination of hardware and/or software to implement a mapping function designed to reversibly map an N-bit input vector D into an M-bit output vector S, where N and M are integer values, and N≤M. The input vector D may be considered to be a binary representation of a number having a value between 0 and $U=2^N-1$. On the other hand, the output vector S may be treated as a binary series of M bits; thus, $S=s(1) \ldots s(M)$. With this arrangement, the number of data bits per baud of the encoded signals 6 output from the constellation mapper 32 can be varied by changing the ratio N:M. This means that the relative system margin can be adjusted to maximize performance of the communications system under the typically sub-optimal conditions prevailing at any given time. For example, in the embodiment of FIG. 5, a controller 34 is connected receive a signal 36 indicative of a performance of the optical transmission link 12. In some embodiments, this signal 36 may comprise an indication of a performance parameter such as a bit error rate detected at the receiver 14 (FIG. 4). The controller 34 may compare the signal 36 to one or more predetermined thresholds, and operate to adjust the mapping implemented by the N/M mapping encoder 28 to tune the performance of the optical transmission link 12. An advantage of this technique is that the number of data bits per baud and the relative system margin can be adjusted without changing the modulation scheme implemented by the constellation mapper 32. This means that it is possible to achieve values of data bits per baud and relative system margin that are intermediate those associated with different modulation schemes.

As may be appreciated, as the ratio N:M is reduced, the likelihood of '0's in the binary series S generated by the N/M mapping encoder 28 increases relative to the likelihood of '1's. Unequal probabilities of '0's and '1's in the binary series S may yield corresponding unequal likelihoods of different symbols in the encoded signals 6 generated by the FEC encoder 30. In some embodiments, this may be used to alter the power distribution of symbols in the encoded signals 6. For example, the binary values assigned to each constellation point of the modulation scheme implemented by the constellation mapper 32 can be selected such that binary values having lower numbers of '1's, or fewer transitions between '0' and '1', are concentrated near the origin of the symbol constellation. With this arrangement, as the number of '0' increases relative to the number of '1's in the binary series S, the proportion of symbols lying close to the origin will increase relative to symbols that are further away from the origin. This may have the effect of altering the power distribution of encoded symbols in the output of the constellation mapper 32. In some embodiments, a Gaussian power distribution of encoded symbols may be achieved.

In some embodiments, the mapping function has at least some of the following properties:

I) The value of N should be a predetermined constant value that is independent from the pattern of the information stream;

II) The value of M should be a predetermined constant value that is independent from the pattern of the information stream;

III) The number of 0's (L) in the output data stream S should be a predetermined constant value that is independent of the pattern of the information stream. This property is specifically required for constellation bit-labeling with variable bit length. Otherwise, it is required that the ratio of L:M, averaged across a plurality of input vectors, is equal to a predetermined target probability level; and IV) The mapping function should be reversible, meaning that no two input vectors D can be mapped to the same output stream S.

When properties I and II above are satisfied, no single error in the input of the N/M mapping encoder 28 will cause unbounded error propagation in the output of the N/M mapping encoder 28.

Property III above means that the respective probability of one element of the output vector S is different from that of at least one other element. For example, the probability of a binary "1" in the output vector S may be different from the probability of a binary "0". In some embodiments, the un-equal probabilities may propagate through the FEC encoder 30 to yield un-equal probabilities of the symbols of the constellation in the drive signals 6. For example, when the probability of a binary "0" is larger than the probability of a binary "1" in the output vector S, the probability of higher energy symbols at the output if the FEC encoder 30 may be lower than the probability of lower energy symbols.

Figure 6:
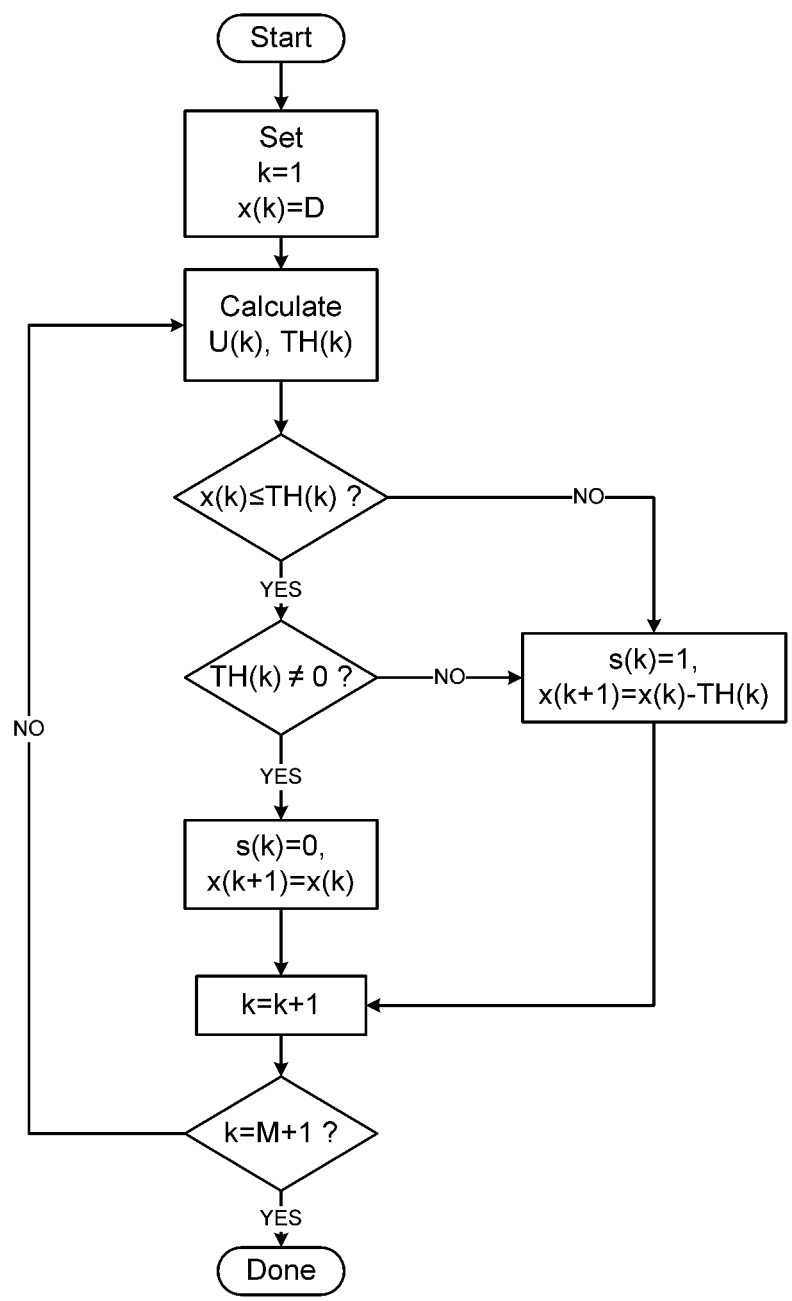
FIG. 6 is a flow-chart illustrating a representative mapping method usable in embodiments of the present invention.

FIG. 6 is a flow chart illustrating an example mapping function that satisfies each of the four properties described above. An advantage of the technique of FIG. 6 is that it can be readily implementing in hardware, which supports high-speed signal processing.

The algorithm of FIG. 6 starts with an N-bit input vector D and generates an M-bit output data stream $S=s(k)$, $k=1 \ldots M$ via recursively calculated values of an upper limit $U(k)$, a Threshold $TH(k)$, and a residue $x(k)$.

At the start of the algorithm (e.g. k=1), the initial residue $x(k)=D$, and the initial Upper limit $U(1)=2^N-1$.

The threshold and upper limit can then be recursively calculated as follows:

$$TH(k) = \frac{B(k)}{(1+M-k)} U(k)$$

$$U(k+1) = U(k) \frac{\Delta_k}{(M-k)}$$

$$\Delta_k = \begin{cases} B(k) & \text{if } s(k)=0 \\ M-k-B(k) & \text{if } s(k)=1 \end{cases}$$

B(k) denotes the number of '0's that remain between s(k) and s(M). Mathematically, B(k) may be represented as:

$$B(k) = L + 1 + \Sigma_{j=1}^{k=1} s(j) - k$$

Where L is the total number of '0's in the output series $S=s(k)$, $k=1 \ldots M$. It will be seen that the initial condition, at k=1, B(k)=L.

During each iteration, the current output value s(k) and the next residue x(k+1) are calculated by comparing the current residue x(k) with the threshold TH(k).

If $(x_{(k)} \leq TH(k))$ and $(TH(k) \neq 0)$, then $s(k)=0$ and $x(k+1)=x(k)$

Otherwise, $s(k)=1$ and $x(k+1)=x(k)-TH(k)$

The above process may iterate for each value of $k=1 \ldots M$.

It can be easily verified that $TH(1) > TH(2) >> TH(M)$; and that $U(1) > U(2) >> U(M)$.

Furthermore, for any value of k, the upper limit $U(k) \geq x(k)$, and $U(k) \geq TH(k)$.

As may be appreciated, the value of L defines a target number of "0"s in the output data stream S. This value is proportional to a desired probability "p" that any given bit of the output data stream M is a "0". During run-time, the threshold can be adjusted upwards or downwards, to ensure that the actual proportion of "0"s in the output signal S closely matches the desired probability "p". In some embodiments, this can be accomplished by monitoring the iterative process of FIG. 6 and tracking the evolving proportion of "0"s in the output data stream S. If the evolving proportion rises above the desired probability "p", then the threshold TH can be reduced to thereby reduce the proportion of "0"s generated in subsequent iterations. Conversely, if the evolving proportion drops below the desired probability "p", then the threshold TH can be increased to thereby increase the proportion of "0"s generated in subsequent iterations.

Those of ordinary skill in the art will appreciated that this technique can be modified as desired to obtain suitable behaviours of the algorithm. For example, if desired, the threshold TH may be adjusted to maintain the proportion of "0"s in the output signal S above a desired minimum value, or below a desired maximum value, or between some desired maximum and minimum value bounds.

In the receiver, the original N-bit input vector D can be reconstructed as:

$$D = x(M+1) + \Sigma_{k=1}^{M} s(k) TH(k)$$

For a fully reversible mapping function, it is necessary that the final residue $x(M+1) < 1$. Furthermore, property III above requires that $\Sigma_{k=1}^{M} s(k) = M - L$. Both of these conditions can be satisfied by setting $$2^N \leq \binom{M}{L}, \text{ where } \binom{M}{L} = \frac{M!}{L!(M-L)!}.$$

In embodiments in which it is desirable to use the largest possible value for N, it is preferable to also set $$2^N \leq \binom{M}{L} < 2^{N+1}.$$

An advantage of this arrangement is that the final residue $x(M+1)$ is not needed in order to reconstruct the N-bit input vector D. Rather, the input vector D can be reconstructed as:

$$D = \lceil \Sigma_{k=1}^{M} s(k) TH(k) \rceil$$

Where $\lceil P \rceil$ is the ceiling function on the real variable 'P'.

Figure 7:
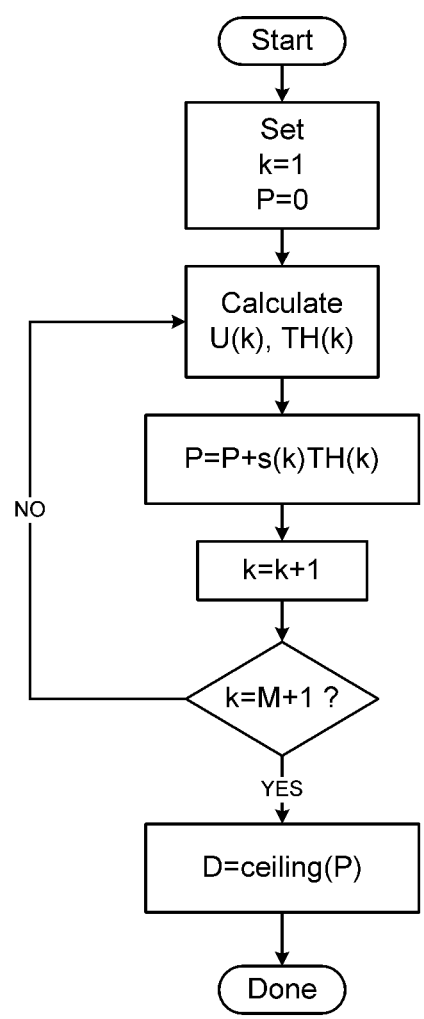
FIG. 7 is a flow-chart illustrating a representative method for reversing the mapping of FIG. 6.

FIG. 7 is a flow chart illustrating a representative process of reconstructing the N-bit vector D from the M-bit data stream $S = s(k)$, $k = 1 \ldots M$. As may be seen in FIG. 7, at the start of the algorithm, the initial values of $k=1$ and $P=0$ are set. During each iteration ($k=1 \ldots M$), the corresponding values of U(k) and TH(k) can be calculated as described above, and used to calculate the incremental value s(k)TH(k) that is added to the variable P. This iterative process is repeated for each value of k until $k=M+1$, to accumulate a value of P. The value of the vector D can then be determined by calculating the ceiling function of the accumulated value P.

Figure 8:
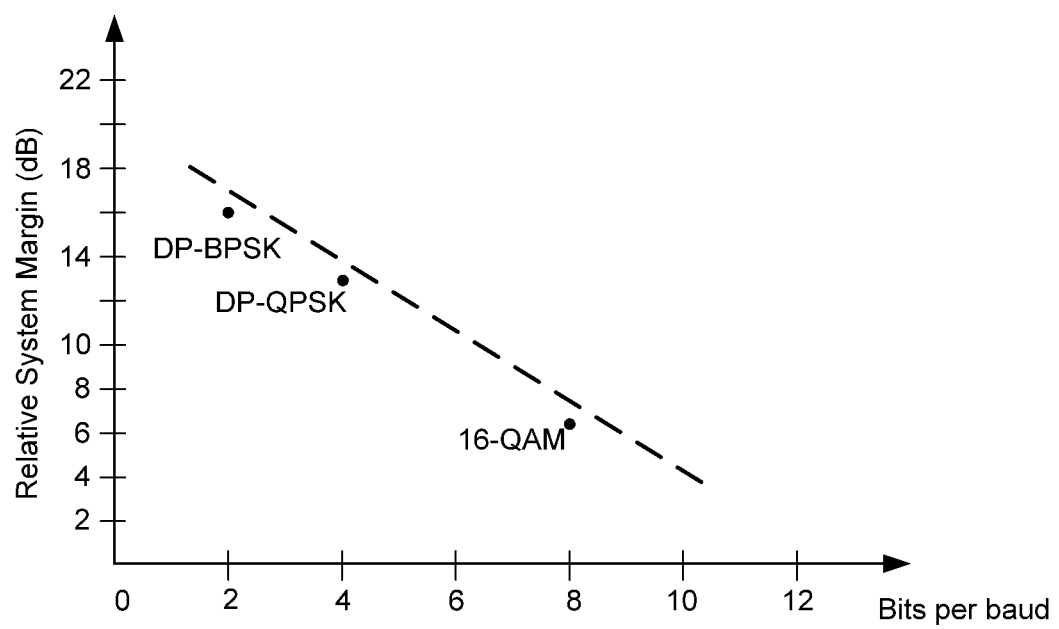
FIG. 8 is a chart illustrating Relative System Margin and data bits-per-baud achievable using methods in accordance with the present invention.

As noted above, the presently disclosed technique enables the optical communications system to operate with values of relative system margin and data bits per baud that are intermediate those associated with different encoding schemes. This feature is illustrated by the dashed line in FIG. 8. As was also noted above, in some cases the mapping implemented by the N/M mapping encoder 28 may also yield unequal probabilities of each symbol of the encoding constellation, and this may yield a Gaussian power distribution of the modulated optical signal. In such cases, the relative system margin for all possible values of bits-per-baud may also be higher than that achieved using conventional methods. This is indicated in FIG. 8 by the dashed line lying above each of the characteristic points of the three identified encoding schemes.

Another advantage of the methods described above with reference to FIGS. 6 and 7 is that they are amenable to implementation in hardware, for example using an Application Specific Integrated Circuit (ASIC) or a Field Programmable Gate Array (FPGA). Hardware implementations are desirable in that they enable the processing to be performed at high speed, which reduces latency.

Further reductions in latency can be obtained by processing two or more vectors D1 ... Dn using respective parallel processing paths. In some embodiments, each path may receive a respective vector D as a block of N contiguous bits of a data steam to be transmitted through the communications system. In other embodiments, each path may receive a respective N-bit vector D comprising interleaved bits from either two or more data streams or two or more blocks of a common data stream.

An advantageous implementation of the constellation mapper 32 is a memory such as the LUT described in U.S. Pat. No. 7,386,240. The outputs desirably include four dimensions, such as XI, XQ, YI, YQ, defining the desired E-field. More dimensions can be used, such as the eight from two time-slots of a dual polarization system. It is advantageous that the outputs are filtered or further processed before being passed to the driver 33 that drives the optical modulator 8. Fewer input bits to the lookup table might be used, or fewer dimensions output. The programmable aspect of the lookup table is advantageous for supporting a variety of modulations. A minimalist version of this function may merely organize the input bits of a symbol and connects them to a downstream unit such as a filter, DAC, or output driver, with no programmable flexibility.

In an alternative embodiment, the N/M mapping encoder 28 may implement a shell code such as described by Fischer (supra).

Figure 9:
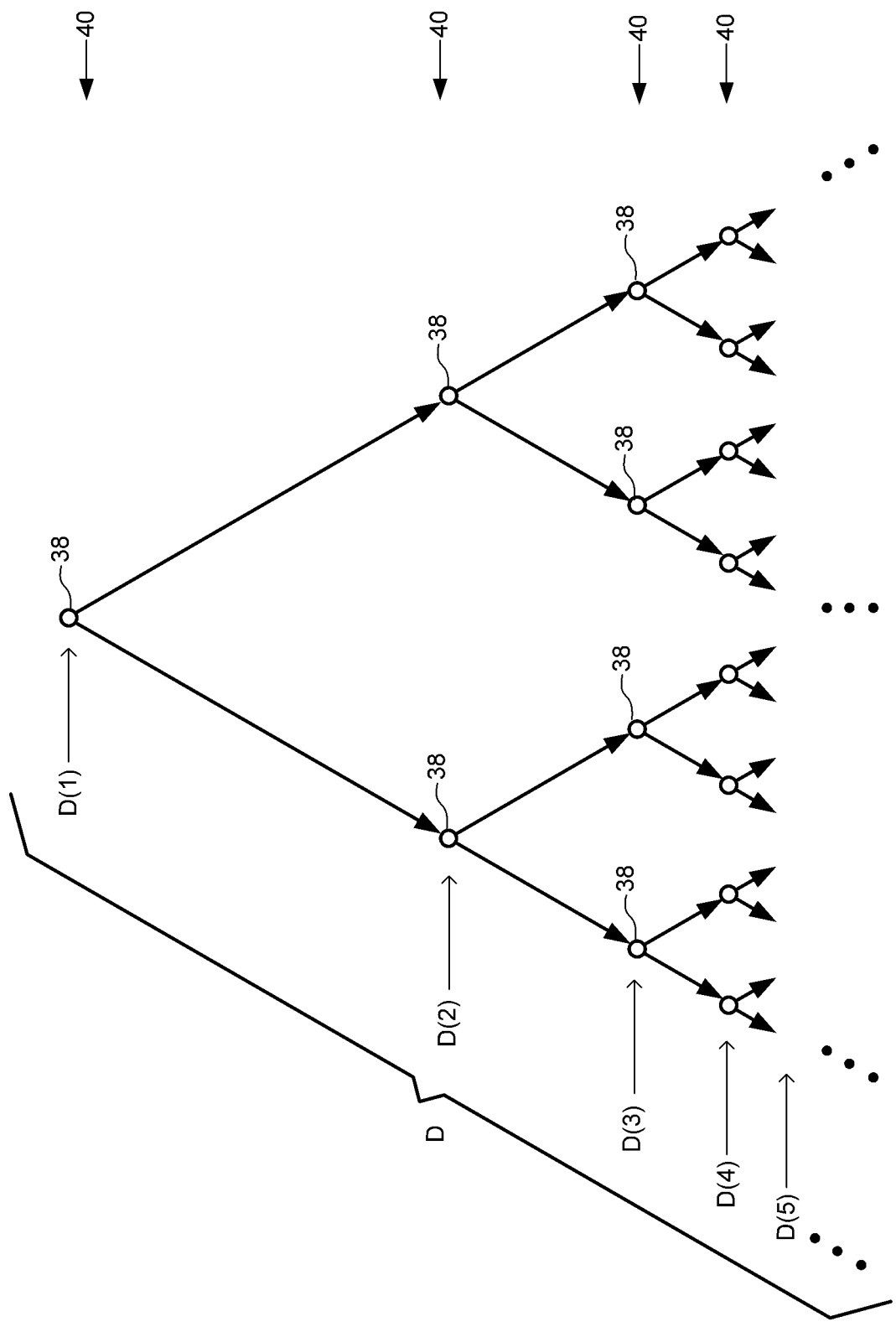
FIG. 9 is a diagram illustrating a tree code.

In a further alternative embodiment, the N/M mapping encoder 28 may implement a tree code. Tree codes (which are a super-set of shell codes) can achieve shaping gain and other desirable properties such as balancing the power or the polarization within a chosen time interval. A further benefit of tree codes is that they can be efficiently implemented in hardware, which enables their use in high baud rate communications systems. FIG. 9 illustrates a representative tree code. As may be seen in FIG. 9, the tree comprises a plurality of nodes 38, each of which has an input and two outputs. In the illustrated embodiment, the nodes 38 are arranged in layers 40. The nodes 38 of each layer 40 also receive a corresponding bit (D(x)) of the N-bit input vector D. The M-bit data stream is output via the "leaves" of the tree (which appear at the bottom of the illustration of FIG. 9). Each node 38 may implement a memoryless logical operation which divides any energy received via its input (e.g. from a node in the previous layer) between each of its two outputs, based on the value of the received vector bit D(x). Since the logical operation implemented by each node is both memoryless and known, the encoding implemented by the tree can be reliably reversed to recover the input vector D from the M-bit data stream.

Shaping gain allows reduced average power for a given coding rate and given noise tolerance. Equivalently, the shaping gain allows an increased signal to noise level for a given coding rate and average power.

With block coding, the rate can be set to the desired value, such as the rational number R=p/q p is a function of the number of input bits to the block and q is function of the number of output bits per block and the number of output bits encoded in each Baud or in each dimension. Preferably, p and q are relatively prime, which in this technique means that they are selected such that they do not share any common factors (except '1'). If q=1 then R is an integer. Typical such values of p/q are 73/64, 69/128, 551/256, or 7999/5192 bits per dimension.

The ability to have fine granularity in the control of the rate R (e.g. bits per dimension) as compared to an integer granularity, allows R to be adjusted so as to just achieve the required noise tolerance without having to round R down to an integer. Given that the integer rate is generally one or two bits per dimension, the wasted fraction has a large impact.

The output of the outer shaping code is a set of bits or symbols that have unequal probability distributions or may have dependence across time in the same block. Systematic forward error correction is applied, so that the output is the original bits (or symbols) and additional syndrome bits (or symbols). BCH product codes, large block Low Density Parity Code (LDPC) codes, or block turbo codes are advantageous FEC methods.

The resulting bits (or symbols) are used to address a constellation mapper that produces the digital representation of the complex dual polarization E-field that, after appropriate filtering, is approximated by the output of the optical modulator.

In some constellation mappings, one can separate the bits into two sets: sign bits and magnitude bits. The distinction between the sets is that a greater optical transmission performance improvement is made by having magnitude bits with a probability of the occurrence of a '1' being other than 0.5, than by having sign bits with a probability of the occurrence of a '1' being other than 0.5. Distinguishing these sets allows shaping and other bit-probability varying methods to have greater effect. In the example below, the sign and magnitude bits literally correspond to signs and magnitudes of the modulation, hence their names, but in general the only requirement is the set distinction.

The above-described techniques can support modulation formats with more than 1 magnitude bit for any constellation point. Since the N/M mapping, FEC encoding scheme and the modulation format implemented by the constellation mapper 32 are all known in detail, it is possible use the mapping function implemented by the N/M mapping encoder 28 to produce different symbol probabilities for different symbols in the symbol stream output from the constellation mapper 32. For example, the probability of the second magnitude bit of each symbol being "0" can be changed depending on the value of the first magnitude bit of the same symbol. In the corresponding embodiments, we will have two parallel flows of bits being processed in accordance with the flowchart of FIG. 6 where in the first flow the second magnitude bit is generated with a specific probability distribution corresponding to the first magnitude bit being "0" while in the second flow, the second magnitude bit is generated with another specific probability distribution corresponding to the first magnitude bit being "0".

By means of the above method, it is possible to select just a subset of the symbol constellation by assigning the probability of other symbols to "0". The subset can be selected based on properties such as Euclidean distance between constellation points, average power, or nonlinear interference, as desired.

In general, magnitude bits might indicate a desired physical property of the optical signal as well. Examples of such physical properties are power or polarization state (i.e. stokes state vector). For those applications, the probability distribution of symbols can be devised such that the desired physical property is kept in an appropriate range in a block of consecutive symbols. Examples of that are keeping the average power between one or many consecutive symbols in a desirable range and/or keeping the average polarization state between one or many consecutive symbols in a desirable range.

It is desirable to use the systematic bits to address a desired aspect such as magnitude or polarization state of the constellation, and the syndrome bits to address the sign or phase aspects. For example, if the modulation is 8-PAM per dimension there are two magnitude bits and one sign bit per dimension. All of the syndrome bits become sign bits, and all of the magnitude bits come from systematic bits. (A few left over systematic bits could become the left over sign bits.) With this addressing, most of the shaping created by the shaping code is preserved in the optical modulation, and the required degree DC balance is preserved because each sign bit has a probability of ½ of having a value of one.

After transmission over the fiber, the receiver detects the bits (or symbols) and passes them to the FEC. If the chosen FEC is a soft decision FEC, a confidence metric such as a log-likelihood ratio is calculated for each bit or symbol. The large block FEC has an output frame error rate that is much less than about $10^{-12}$, in the operating regime. With the probability of an error in the frame being approximately zero, the error multiplication effect is no longer a performance impediment, and the full shaping gain, and fractional rate gain is achieved.

The embodiments of the invention described above are intended to be illustrative only. The scope of the invention is therefore intended to be limited solely by the scope of the appended claims.

What is claimed is:

1. A method of transmitting a binary data signal using a transmitter of a communications system, wherein the bits of the binary data signal have a probability of being a '1' substantially equal to 0.5, the method comprising:
   applying a shaping operation to the binary data signal to generate a shaped data signal, the shaping operation creating a plurality of shaped bits with a probability of being a '1' other than 0.5;
   calculating a parity equation based at least in part upon a first shaped bit; and
   choosing a symbol to transmit, the choice of amplitude of the symbol being based at least in part upon a second shaped bit, wherein a sign of the symbol is based at least in part upon the parity equation, and the probability that the sign of the symbol is positive is substantially equal to the probability that the sign of the symbol is negative.

2. The method as recited in claim 1, wherein the communications system is an optical communications system, the method further comprising modulating a carrier light according to the chosen symbol to generate an optical signal for transmission through the optical communications system.

3. A transmitter of a communications system, the transmitter comprising:
- a first encoder configured to apply a shaping operation to a binary data signal to generate a shaped data signal, wherein the bits of the binary data signal have a probability of being a '1' substantially equal to 0.5 and the shaping operation creates a plurality of shaped bits with a probability of being a '1' other than 0.5;
- a second encoder configured to calculate a parity equation based at least in part upon a first shaped bit; and
- a constellation mapper configured to choose a symbol to transmit, the choice of amplitude of the symbol being based at least in part upon a second shaped bit, where a sign of the symbol is based at least in part upon the parity equation, and the probability that the sign of the symbol is positive is substantially equal to the probability that the sign of the symbol is negative.

4. The transmitter as recited in claim 3, wherein the communications system is an optical communications system, the transmitter further comprising a modulator configured to modulate a carrier light according to the chosen symbol to generate an optical signal for transmission through the optical communications system.

5. A method of transmitting a data signal using a transmitter of a communications system, the method comprising:
- applying a shaping operation to the data signal to generate a shaped data signal;
- encoding the shaped data signal according to a forward error correction (FEC) scheme to generate an encoded signal; and
- modulating the encoded signal to symbol values according to a modulation scheme to generate a corresponding symbol stream for transmission through the communications system,
- wherein the shaping operation reduces average constellation energy for constellations of the modulation scheme.

6. The method as recited in claim 5, further comprising modulating a carrier according to the symbol stream to generate a signal for transmission through the communications system.

7. The method as recited in claim 5, wherein encoding the shaped signals according to the FEC scheme and modulating the encoded signal to symbol values according to the modulation scheme substantially preserves the reduction in average constellation energy.

8. The method as recited in claim 5, wherein the shaping operation comprises probabilistic shaping.

9. The method as recited in claim 8, wherein each symbol comprises one or more dimensions and the shaping operation alters the probability distribution of the amplitude of a dimension in the symbol stream while substantially preserving the sign of the dimension.

10. The method as recited in claim 9, wherein the sign of the dimension is substantially determined by overhead bits generated by the FEC encoding.

11. The method as recited in claim 5, wherein the communications system is an optical communications system and modulating the encoded symbol comprises modulating light according to the symbol stream to generate an optical signal for transmission through the optical communications system.

12. A transmitter of a communications system, the transmitter comprising:
- a first encoder configured to apply a shaping operation to a data signal to generate a shaped data signal;
- a second encoder configured to encode the shaped data signal according to a forward error correction (FEC) scheme to generate an encoded signal; and
- a constellation mapper configured to modulate the encoded signal to symbol values according to a modulation scheme to generate a corresponding symbol stream for transmission through the communications system,
- wherein the shaping operation reduces average constellation energy for constellations of the modulation scheme.

13. The transmitter as recited in claim 12, further comprising a modulator to modulate a carrier according to the symbol stream to generate a signal for transmission through the communications system.

14. The transmitter as recited in claim 12, wherein encoding the shaped signals according to the FEC scheme and modulating the encoded signal to symbol values according to the modulation scheme substantially preserves the reduction in average constellation energy.

15. The transmitter as recited in claim 12, wherein the shaping operation comprises probabilistic shaping.

16. The transmitter as recited in claim 15, wherein each symbol comprises one or more dimensions and the shaping operation alters the probability distribution of the amplitude of a dimension in the symbol stream while substantially preserving the sign of the dimension.

17. The transmitter as recited in claim 16, wherein the sign of the dimension is substantially determined by overhead bits generated by the FEC encoding.

18. The transmitter as recited in claim 12, wherein the communications system is an optical communications system, the transmitter further comprising a modulator to modulate light according to the symbol stream to generate an optical signal for transmission through the optical communications system.

* * * * *